Oct. 14, 1947.  J. C. NEELEY  2,429,028
COLLAPSIBLE ONE-WHEELED CARRIER
Filed Oct. 15, 1945   2 Sheets-Sheet 1
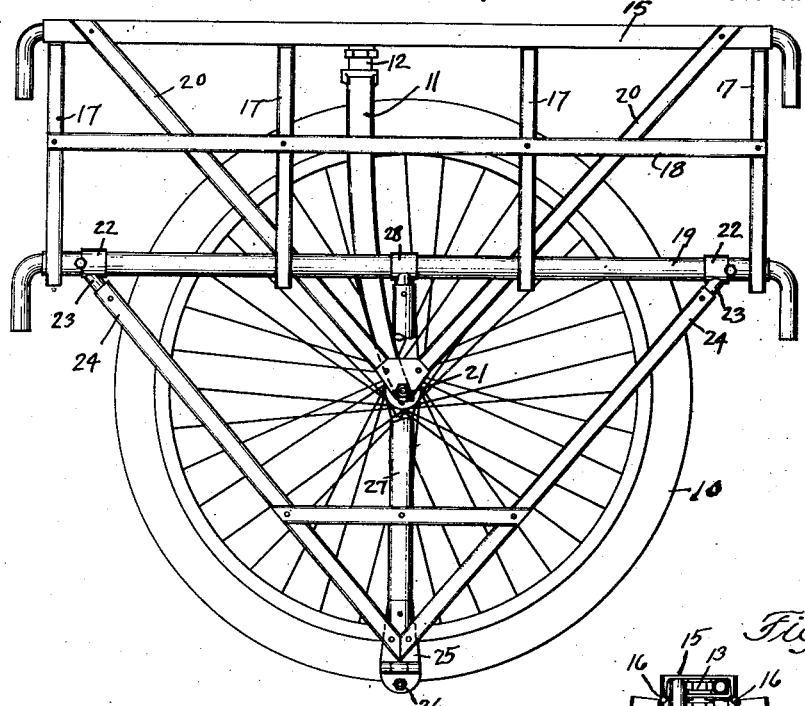
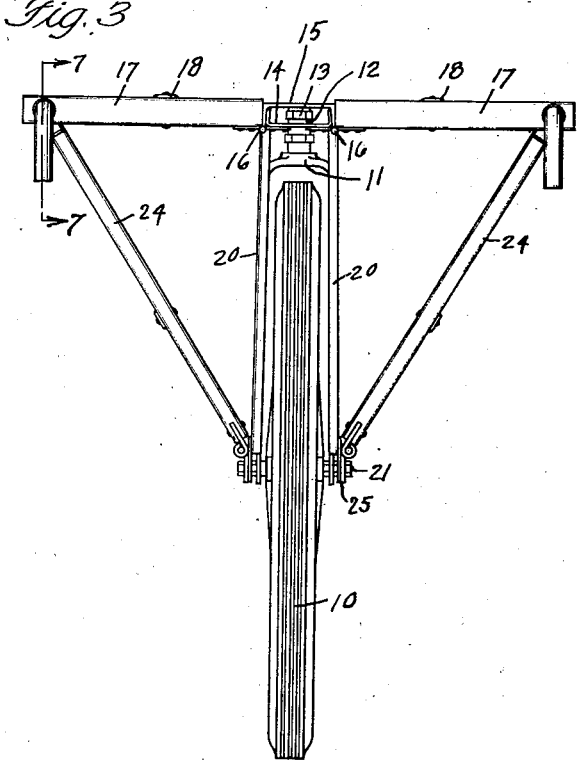
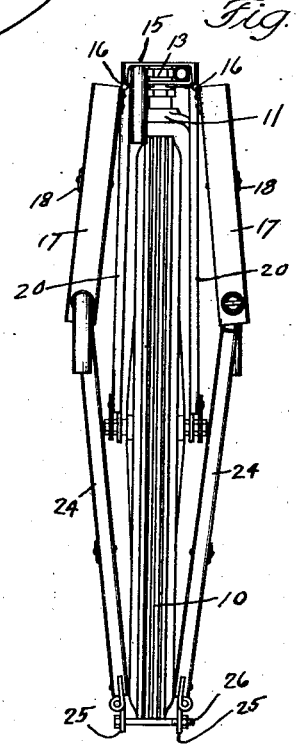
INVENTOR
James C. Neeley
BY
ATTORNEY Oct. 14, 1947.  J. C. NEELEY  2,429,028
COLLAPSIBLE ONE-WHEELED CARRIER
Filed Oct. 15, 1945  2 Sheets-Sheet 2
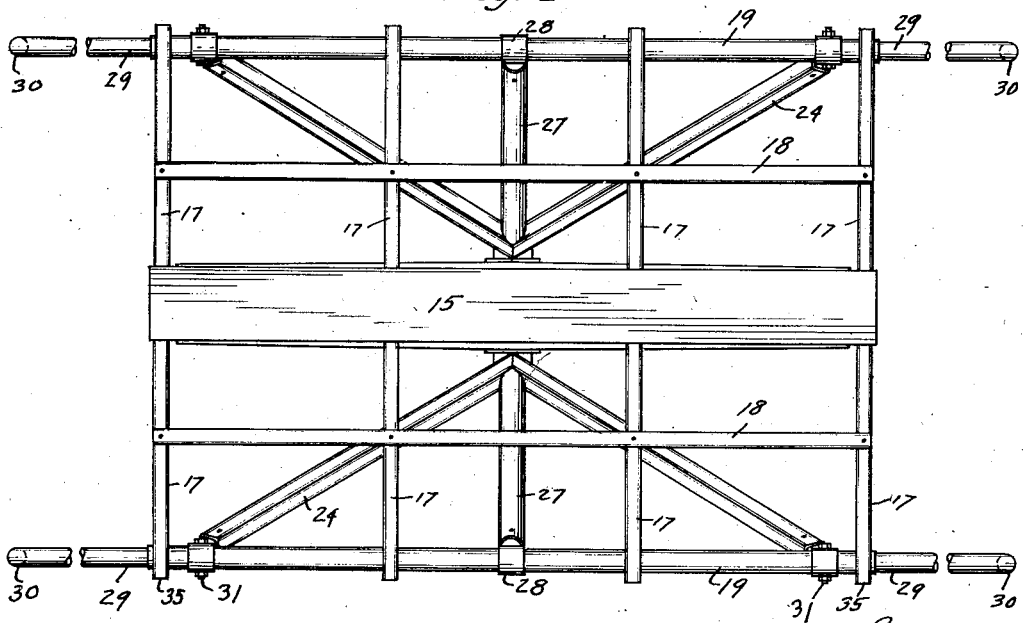
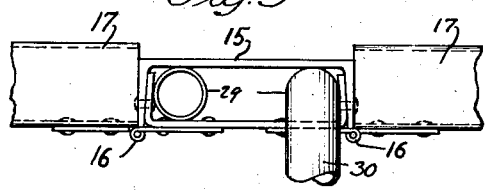
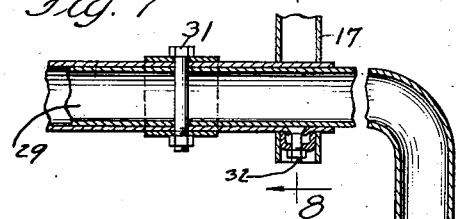
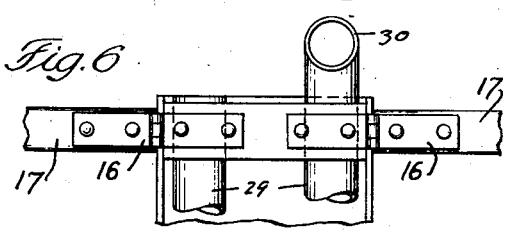
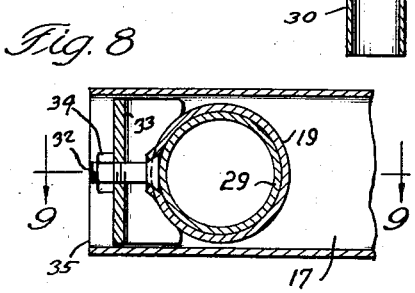
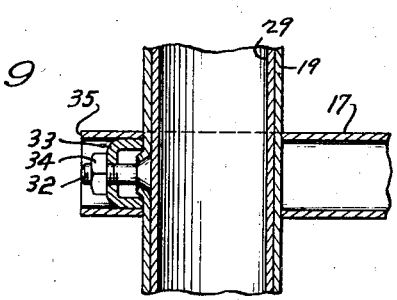
INVENTOR
James C. Neeley
BY
ATTORNEY Patented Oct. 14, 1947

2,429,028

UNITED STATES PATENT OFFICE 2,429,028

COLLAPSIBLE ONE-WHEELED CARRIER

James C. Neeley, Portland, Oreg.

Application October 15, 1945, Serial No. 622,456

4 Claims. (Cl. 280—42)

This invention relates generally to land traveling vehicles and particularly to a tandem carrier.

The main object of this invention is to provide a vehicle especially adapted for use by hunters and fishermen for transporting packs over rough terrain, in which the weight is carried by the vehicle and the balancing and propelling power is provided by two operators.

The second object is to construct a vehicle of the class described which is exceedingly light in relation to the load which may be carried, and also that the vehicle may be easily collapsed for storage or transportation.

I accomplish these and other objects in a manner set forth in the following specification as illustrated in the accompanying drawings, in which Fig. 1 is a side elevation of the device in its collapsed form.

Fig. 2 is an end elevation of Fig. 1.

Fig. 3 is an end elevation showing the device ready for use.

Fig. 4 is a plan of Fig. 3.

Fig. 5 is a fragmentary end view showing the storage space for the operating handles.

Fig. 6 is a fragmentary bottom view of Fig. 5.

Fig. 7 is a section taken along the line 7—7 in Fig. 3.

Fig. 8 is a section taken along the line 8—8 in Fig. 7.

Fig. 9 is a section taken along the line 9—9 in Fig. 8.

Similar numerals refer to similar parts throughout the several views.

Referring in detail to the drawings, there is shown a single ground-engaging wheel 10, which is supported by a fork 11 such as is commonly found on an ordinary bicycle. The upper end 12 of the fork 11 is secured by the nut 13 to the lower channel member 14 and covered by the upper channel member 15 into which the channel member 14 extends. The member 14 extends the full length of the member 15.

Attached to the members 14 and 15 by means of the hinges 16 are the arms 17 whose intermediate portions are joined by the tie bars 18 and whose outermost ends are united by the tubes 19. It is desirable to provide side braces 20 between the outermost ends of the member 15 and the axle 21 of the wheel 10.

Mounted on the sleeves 22 are the angular shanks 23 to which are attached the braces 24 which extend to a hinge plate 25 provided with an opening for the axle bolt 21 or a clamping bolt 26. The plate 25 is further braced by means of a central strut 27 which is secured to the sleeve 28 on the tube 19. This construction exists on both sides of the member 15.

Within the tubes 19 are inserted the tubular handles 29 whose ends 30 are down turned to facilitate the operation of the carrier. Owing to the length of the members 29 only one can be stored in its respective tube 19 at a time. Its companion handle 29 is therefore stored in the space between the channel members 14 and 15 as shown in Fig. 5.

In Fig. 7 is shown the manner of securing the handle 29 in place by means of a bolt 31. There is also shown the manner of attaching the arms 17 to the tubes 19, and this consisting mainly in providing the tube 19 with an outwardly projecting bolt 32 which passes through a saddle clamp 33 and is held in place by means of a nut 34 which is accessible from the end 35 of the arm 17. Attention is drawn to my co-pending application, Number 571,143, Patent No. 2,416,492, issued February 25, 1947, over which the device described herein is an improvement.

While I have thus illustrated and described my invention, it is not my desire to be limited to the precise form shown herein, and I intend to cover such forms and modifications of the invention as fall fairly within the appended claims.

I claim:

1. A carrier having in combination a ground-engaging wheel, a fork for receiving said wheel, an elongated channel member mounted on said fork, sides hinged to said channel member and means for bracing said sides to the wheel axle.

2. A carrier of the class described consisting of a ground-engaging wheel, a fork attached to said wheel and extending upwardly therefrom, an elongated channel member mounted on said fork, a pair of drop leaves attached to the sides of said channel member, the outer edges of said drop leaves having tubular members mounted along same, handles telescopically mounted in said tubular members and braces for said tubular members, removably attached to the axle of the wheel to permit the dropping of said leaves, the point of fastening of said braces to said axle constituting a point of clamping the braces in a collapsed position.

3. A device of the class described consisting of a ground-engaging wheel, an elongated channel frame mounted over said wheel in the frame thereof occupied by said wheel, drop leaves on the sides of said channel-shaped frame having tubular outer edges, braces hinged to the outer edges of said leaves having a single point fastening at the outer end thereof, capable of being attached to the axle bolt of the wheel, and handle members mounted in said tubular leaf members having their outer ends turned downwardly.

4. In the device of the class described, a combination of an elongated channel member, a fork secured to said channel member between the ends thereof, a wheel mounted in said fork, braces between the wheel axle and the outer-most ends of the channel, drop leaves hinged to opposite sides of said channel adapted to fold downwardly against said wheel, braces hinged to the outer ends of said drop leaves and attachable to the axle bolt of the wheel, and extendable handles for said tubular member having their outer ends turned downwardly and having means for securing same in a desired position when in use or in storage within said channel member.

JAMES C. NEELEY.

REFERENCES CITED

The following references are of record in the file of this patent:

FOREIGN PATENTS

| Number | Country | Date |
|---|---|---|
| 4,968 | Great Britain | Nov. 13, 1913 |
| 340,297 | Germany | Sept. 8, 1921 |